US010031279B2

(12) United States Patent
Gu et al.

(10) Patent No.: US 10,031,279 B2
(45) Date of Patent: Jul. 24, 2018

(54) DISPLAY MODULE OF LIQUID CRYSTAL DISPLAY AND MOBILE TERMINAL

(71) Applicant: ZTE CORPORATION, Shenzhen, Guangdong Province (CN)

(72) Inventors: Zhicheng Gu, Shenzhen (CN); Zhongkui Qu, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 135 days.

(21) Appl. No.: 14/917,821

(22) PCT Filed: Nov. 14, 2013

(86) PCT No.: PCT/CN2013/087154
§ 371 (c)(1),
(2) Date: Mar. 22, 2016

(87) PCT Pub. No.: WO2014/134928
PCT Pub. Date: Sep. 12, 2014

(65) Prior Publication Data
US 2016/0223733 A1    Aug. 4, 2016

(30) Foreign Application Priority Data
Sep. 10, 2013    (CN) .................... 2013 2 0586195 U

(51) Int. Cl.
*F21V 8/00* (2006.01)
*G02F 1/1333* (2006.01)
*G02F 1/13357* (2006.01)

(52) U.S. Cl.
CPC .......... *G02B 6/009* (2013.01); *G02B 6/0068* (2013.01); *G02B 6/0073* (2013.01);
(Continued)

(58) Field of Classification Search
CPC .... G02B 6/009; G02B 6/0068; G02B 6/0073; G02F 1/1336; G02F 1/133308; G02F 2202/28
See application file for complete search history.

(56) References Cited

U.S. PATENT DOCUMENTS

2007/0014097 A1* 1/2007 Park .................... G02B 6/0036
                                                362/23.15
2007/0132906 A1* 6/2007 Shen ................. G02F 1/133308
                                                349/58
(Continued)

FOREIGN PATENT DOCUMENTS

| CN | 201811094 U | 4/2011 |
|----|-------------|--------|
| CN | 102062326 A | 5/2011 |
| EP | 1944629 B1  | 4/2010 |
| JP | 2007322965 A| 12/2007 |

OTHER PUBLICATIONS

International Search Report (Form PCT/ISA/210) for International Application No. PCT/CN2013/087154 dated Jun. 25, 2014.

*Primary Examiner* — Angela Davison
*Assistant Examiner* — Mariam Qureshi
(74) *Attorney, Agent, or Firm* — Koppel, Patrick, Heybl & Philpott

(57) ABSTRACT

The disclosure discloses a display component of a Liquid Crystal Display (LCD), wherein the display component is assembled with a mainboard of a mobile terminal for use. The display component includes: a rubber frame, arranged on an LCD; an adhesion material, arranged in the rubber frame; a lamp strip of which two sides are provided with Light Emitting Diode (LED) lamps, a circuit for controlling the LED lamps and a conductor for connecting the circuit with the mainboard of the mobile terminal being further arranged on the lamp strip; and a light guide plate, arranged between the LED lamps in the rubber frame. By the technical solutions, the technical problems of influence of sand- (Continued)

wiching of the light guide plate between the LCD and a Capacitive Touch Panel (CTP) on a lamination process and bright lines in an area close to characters of the whole screen are solved, lamination yield of the LCD and the CTP is improved, and the bright lines in the area close to the characters of the whole screen are eliminated.

14 Claims, 1 Drawing Sheet

(52) U.S. Cl.
CPC ...... *G02F 1/1336* (2013.01); *G02F 1/133308* (2013.01); *G02F 2202/28* (2013.01)

(56) References Cited

U.S. PATENT DOCUMENTS

| | | | |
|---|---|---|---|
| 2009/0185100 A1* | 7/2009 | Matsuhira | G02B 6/005 349/58 |
| 2010/0165239 A1* | 7/2010 | Lee | G02F 1/133385 349/58 |
| 2012/0257414 A1 | 10/2012 | Park et al. | |
| 2013/0082984 A1* | 4/2013 | Drzaic | G09G 3/20 345/204 |
| 2015/0002785 A1* | 1/2015 | Huang | G02B 6/0066 349/65 |
| 2015/0036385 A1* | 2/2015 | Kawai | G02B 6/0031 362/613 |

* cited by examiner

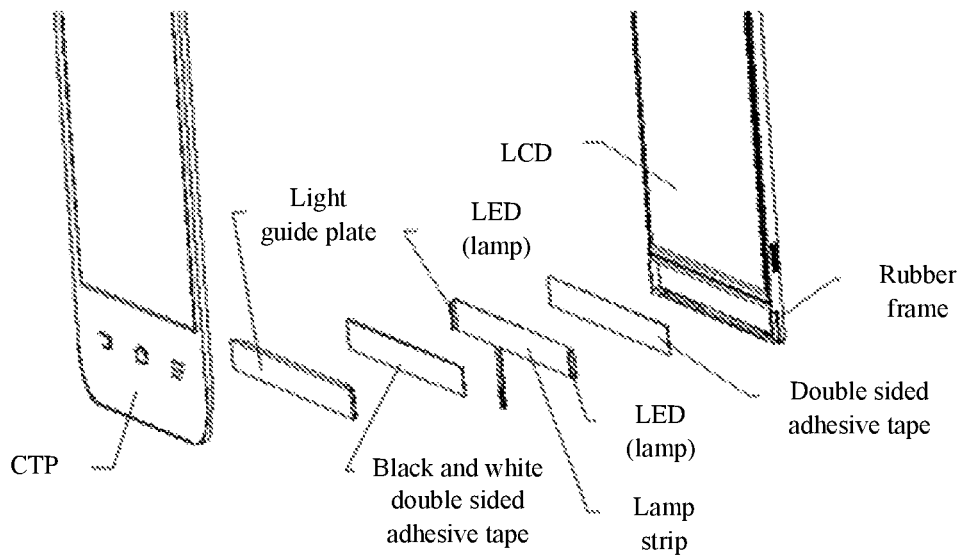

DISPLAY MODULE OF LIQUID CRYSTAL DISPLAY AND MOBILE TERMINAL

TECHNICAL FIELD

The disclosure relates to mobile terminal display screen technology field, and in particular to a display component of an Liquid Crystal Display (LCD) of a mobile terminal and the mobile terminal.

BACKGROUND

At present, a display component of an LCD widely applied to a mobile terminal is laminated to a Capacitive Touch Panel (CTP) to be assembled with a front shell of the mobile terminal for use as a whole. Character keys below a touch panel are required to be lightened according to a specific operation mode. In order to uniquely lighten character keys, it is necessary to independently sandwich a light guide plate between the LCD and the CTP and guide light into a character area, which may cause influence on an LCD and CTP lamination process, reduce a lamination yield and moreover, produce bright lines in an area close to the characters on the whole screen under some circumstances.

SUMMARY

In view of this, a main purpose of the embodiments of the disclosure is to provide a display component of an LCD and a mobile terminal, which may reduce influence of sandwiching of a light guide plate between the LCD and a CTP on lamination yield and eliminate bright lines in an area close to characters of the whole screen.

The technical solutions of the embodiments of the disclosure are implemented as follows.

A display component of an LCD is provided, wherein the display component is assembled with a mainboard of a mobile terminal for use, and comprises: a rubber frame, arranged on the LCD; an adhesion material, arranged in the rubber frame; a lamp strip, of which two sides are provided with Light Emitting Diode, LED, lamps, a circuit for controlling the LED lamps and a conductor for connecting the circuit with the mainboard of the mobile terminal being further arranged on the lamp strip; and a light guide plate, arranged between the LED lamps in the rubber frame.

In an example embodiment, the conductor is connected with the mainboard of the mobile terminal in a welding manner.

In an example embodiment, the lamp strip is made from a Flexible Printed Circuit, FPC, or a Printed Circuit Board, PCB.

In an example embodiment, the display component of the LCD further comprises a black and white adhesive arranged between the lamp strip and the light guide plate, wherein a black side of the black and white adhesive faces the lamp strip, and a white side of the black and white adhesive faces the light guide plate.

In an example embodiment, the adhesion material is a double sided adhesive tape or a glue solution.

A mobile terminal is provided, which may include the abovementioned LCD display component, wherein a part illuminated by the display component of the LCD is a character key area of the mobile terminal.

Compared with the related art, the solutions provided by the embodiment of the disclosure have the advantages that lamination yield of an LCD and a CTP is improved, and bright lines an area close to characters of the whole screen are eliminated.

BRIEF DESCRIPTION OF THE DRAWINGS

The drawings are adopted to provide further understanding of the disclosure, and form a part of the disclosure. Schematic embodiments of the disclosure and description thereof are adopted to explain the disclosure and not intended to form improper limits to the disclosure. In the drawings:

FIG. 1 is an exploded view of a display component of an LCD.

DETAILED DESCRIPTION OF THE EMBODIMENTS

The disclosure will be described below with reference to the drawings and embodiments in detail. It needs to be noted that the embodiments in the disclosure and characteristics in the embodiments may be combined under the condition of no conflicts.

FIG. 1 is an exploded view of a display component of an LCD. As shown in FIG. 1, a rubber frame is adhered to an LCD, and a double sided adhesive tape, a lamp strip, a black and white double sided adhesive tape and a light guide plate are sequentially arranged in the rubber frame, wherein the double sided adhesive tape is configured to adhere the lamp strip; the lamp strip is made from an FPC or a PCB, an LED lamp is arranged on each of two sides, close to a short side, of the lamp strip, a circuit for controlling the LED lamps and a conductor for connecting the circuit with a mainboard of a mobile terminal are further arranged on the lamp strip, the conductor is connected with the mainboard of the mobile terminal in a welding manner, and the mainboard supplies power to the LED lamps, and transmits a signal to the circuit to control work of the LED lamps; a black side of the black and white double sided adhesive tape faces the lamp strip, while a white side faces the light guide plate, so that light of the LED lamps is reflected to the light guide plate at the same time that an adhesion function is realized; and the light guide plate is arranged between the LED lamps on the two sides of the lamp strip, so that light emitted by the LED lamps may uniformly irradiate a character area of a CTP in front.

The disclosure further records a mobile terminal, which includes the display component of the LCD shown in FIG. 1, wherein a part illuminated by the display component of the LCD is a character key area of the mobile terminal.

The above is only the example embodiments of the disclosure and not intended to limit the disclosure, and for those skilled in the art, the disclosure may have various modifications and variations. Any modifications, equivalent replacements, improvements and the like made within a spirit and principle of the disclosure shall fall within the scope of protection of the disclosure.

INDUSTRIAL APPLICABILITY

The technical solutions provided by the disclosure may be applied to a display component of an LCD, and by adopting the above-mentioned technical solutions, the problems of lower lamination yield and bright lines produced in an area close to characters of the whole screen under some circumstances in the related art are solved, lamination yield of the LCD and a CTP is improved, and the bright lines in the area close to the characters of the whole screen are eliminated.

What is claimed is:

1. A display component of a Liquid Crystal Display, LCD, wherein the display component is assembled with a mainboard of a mobile terminal for use, and comprises:
   a rubber frame, arranged on the LCD;
   an adhesion material, arranged in the rubber frame;
   a lamp strip, of which two sides are provided with Light Emitting Diode, LED, lamps, a circuit for controlling the LED lamps and a conductor for connecting the circuit with the mainboard of the mobile terminal being further arranged on the lamp strip; and
   a light guide plate, arranged between the LED lamps in the rubber frame;
   wherein the display component of the LCD further comprises a black and white adhesive arranged between the lamp strip and the light guide plate, wherein a black side of the black and white adhesive faces the lamp strip, and a white side of the black and white adhesive faces the light guide plate.

2. The display component of the LCD according to claim 1, wherein the conductor is connected with the mainboard of the mobile terminal in a welding manner.

3. The display component of the LCD according to claim 1, wherein the lamp strip is made from a Flexible Printed Circuit, FPC, or a Printed Circuit Board, PCB.

4. The display component of the LCD according to claim 1, wherein the adhesion material is a double sided adhesive tape or a glue solution.

5. A mobile terminal, comprising the display component of the LCD according to claim 1.

6. The mobile terminal according to claim 5, wherein a part illuminated by the display component of the LCD is a character key area of the mobile terminal.

7. The display component of the LCD according to claim 2, wherein the adhesion material is a double sided adhesive tape or a glue solution.

8. The display component of the LCD according to claim 3, wherein the adhesion material is a double sided adhesive tape or a glue solution.

9. A mobile terminal, comprising the display component of the LCD according to claim 2.

10. A mobile terminal, comprising the display component of the LCD according to claim 3.

11. A mobile terminal, comprising the display component of the LCD according to claim 4.

12. A mobile terminal, comprising the display component of the LCD according to claim 7.

13. A mobile terminal, comprising the display component of the LCD according to claim 8.

14. A mobile terminal, comprising the display component of the LCD according to claim 1.

* * * * *